United States Patent
Jin et al.

(10) Patent No.: US 10,733,066 B2
(45) Date of Patent: Aug. 4, 2020

(54) PERSISTENT RESERVATION COMMANDS IN A DISTRIBUTED STORAGE SYSTEM

(71) Applicant: HEWLETT PACKARD ENTERPRISE DEVELOPMENT LP, Houston, TX (US)

(72) Inventors: Tao Jin, Cary, NC (US); Kevin Kauffman, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 232 days.

(21) Appl. No.: 15/916,576

(22) Filed: Mar. 9, 2018

(65) Prior Publication Data
US 2019/0278672 A1    Sep. 12, 2019

(51) Int. Cl.
*G06F 11/00*    (2006.01)
*G06F 11/20*    (2006.01)
*G06F 3/06*    (2006.01)

(52) U.S. Cl.
CPC .......... *G06F 11/201* (2013.01); *G06F 3/0617* (2013.01); *G06F 3/0634* (2013.01); *G06F 11/2005* (2013.01); *G06F 11/2033* (2013.01); *G06F 3/067* (2013.01)

(58) Field of Classification Search
CPC .. G06F 11/201; G06F 11/2033; G06F 3/0634; G06F 3/0617; G06F 11/2005; G06F 3/067
USPC .......................................................... 714/17
See application file for complete search history.

(56) References Cited

U.S. PATENT DOCUMENTS

| | | |
|---|---|---|
| 7,631,066 B1 | 12/2009 | Schatz et al. |
| 10,613,779 B1* | 4/2020 | Brooks ................. G06F 3/0632 |
| 2004/0205148 A1 | 10/2004 | Bae et al. |
| 2013/0205108 A1 | 8/2013 | Perelstein et al. |
| 2015/0127917 A1 | 5/2015 | Mettu et al. |
| 2015/0350318 A1 | 12/2015 | Van Assche et al. |
| 2016/0077752 A1* | 3/2016 | Vanninen .............. G06F 3/0665 711/114 |
| 2016/0077996 A1* | 3/2016 | Bali .................... G06F 13/4282 710/306 |

OTHER PUBLICATIONS

Butt, K., "Revisions," (Technical Paper), Jan. 7, 2008, http://t10.org/ftp/t10/document.08/08-025r2.pdf.
NETAPP, "What are SCSI Reservations and SCSI Persistent Reservations?," Nov. 23, 2016, Article No. 000003030, <https://kb.netapp.com/support/s/article/what-are-scsi-reservations-and-scsi-persistent-reservations?language=en_US>.

* cited by examiner

*Primary Examiner* — Yair Leibovich
(74) *Attorney, Agent, or Firm* — Hewlett Packard Enterprise Patent Department (57) ABSTRACT

Certain examples described herein relate to Persistent Reservation commands in a distributed storage system. In one example, a Persistent Reservation command is received. It is determined whether the Persistent Reservation command indicates persistence through power loss. It is also determined whether a group leader of the distributed storage system is synchronized with a backup group leader. Responsive to the group leader being synchronized with the backup group leader, the command is admitted.

20 Claims, 4 Drawing Sheets

PERSISTENT RESERVATION COMMANDS IN A DISTRIBUTED STORAGE SYSTEM

BACKGROUND

Distributed storage systems, such as storage area networks, are used in modern computing systems to provide data storage to computer devices. For example, many modern computing applications demand high availability, fault tolerance and easy scalability. In a distributed storage system, multiple storage nodes may be configured to provide client devices with access to data storage, wherein each storage node may be communicatively coupled to data storage devices such as disk drives and tape drives. To connect and control the data storage devices, standards such as the Small Computer System Interface (SCSI) may be used. In version 3 and above of the SCSI standard (known as SCSI-3), a mechanism called Persistent Reservations (PR) is defined. Persistent Reservations provide a way to control how client devices (as hosts) access data storage devices, e.g. where a cluster of data storage devices is provided, such as over a network using the Internet SCSI (iSCSI) standard, or over a network using the Fibre Channel (FC) standard.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein provide a way to manage fault tolerance in distributed storage systems that use Persistent Reservations. In these examples, high availability is provided by having a group leader, which manages a set of storage nodes in the distributed storage system, and a backup group leader, which is arranged to take over control from the group leader if failure occurs or the group leader is otherwise inaccessible.

A group leader may synchronize Persistent Reservation data with storage nodes, which includes a backup group leader, such that the backup group leader can take over control of Persistent Reservation management. In such examples, synchronization of Persistent Reservation data involves all storage nodes to being up-to-date before a new command, such as a new reservation from a host, can be accepted and acknowledged. This can lead to issues. For example, in certain implementations, incoming Persistent Reservation commands may be blocked if storage nodes, including the backup group leader, fall out of synchronization. This may occur if there are communication failures across the network that couples storage nodes. Blocking incoming commands can halt data operations for applications and services, leading to errors and data inaccessibility.

Certain examples described herein overcome these issues by adding functionality to the distributed storage system. In these examples, Persistent Reservation commands are filtered, wherein commands are admitted (e.g. further processed) if filter conditions are met. These conditions include a check on whether persistence through power loss is requested and whether the group leader is synchronized with the backup group leader. In certain cases, a check on synchronization is performed when the commands indicate persistence through power loss, allowing commands that do not have this feature enabled to fall out of synchronization. If failure occurs, any commands that do not have persistence through power loss enabled may be cleared from data held by the backup group leader. Applying synchronization to a subset of commands means fewer commands are blocked if the group leader and backup group leader fall out of synchronization. This reduces data interruptions and provides better data accessibility.

Figure 1:
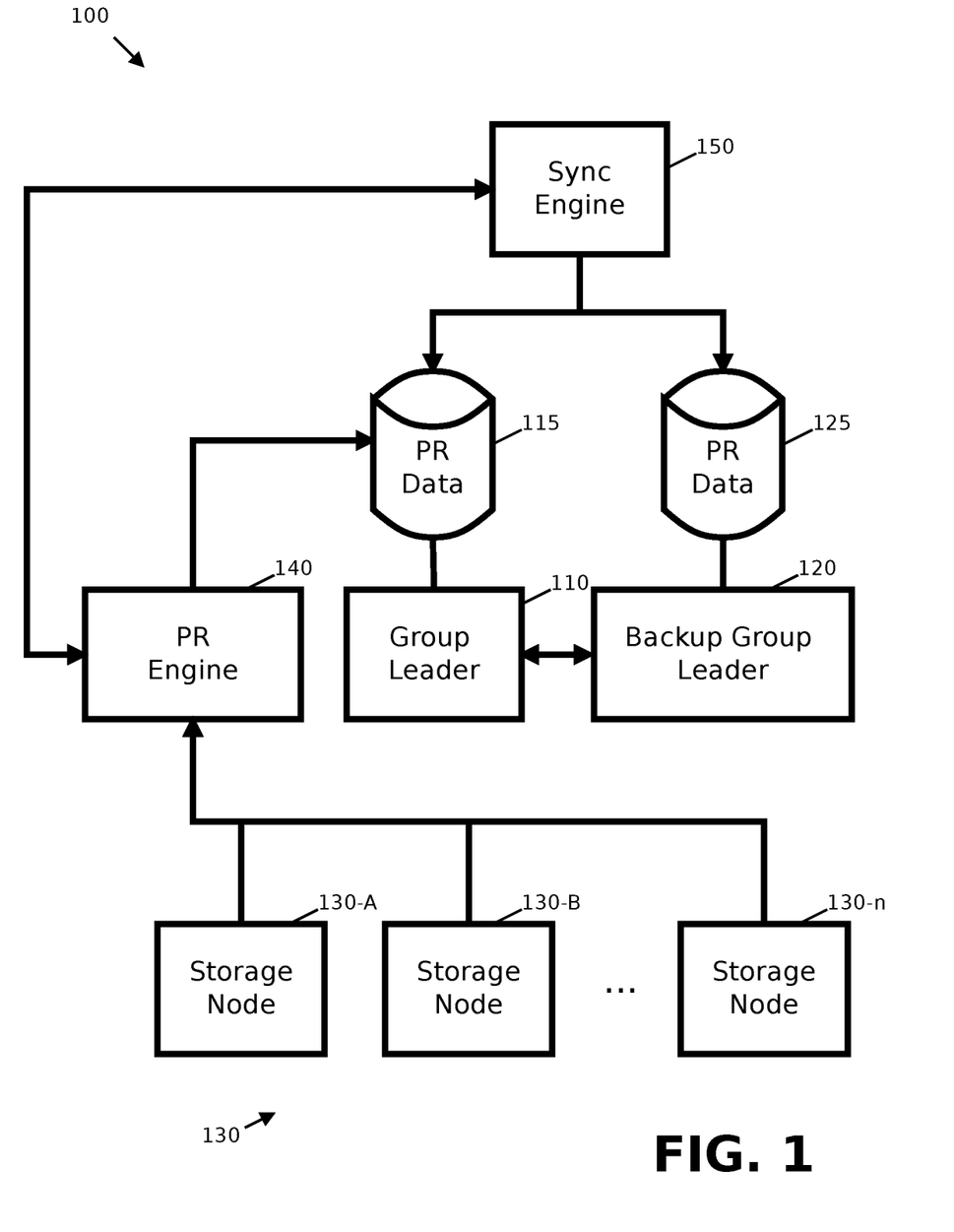
FIG. 1 is a schematic diagram of a distributed storage system according to an example.

FIG. 1 shows a schematic diagram of a distributed storage system 100 according to an example. The distributed storage system 100 comprises a group leader 110 and a backup group leader 120. The group leader 110 and backup group leader 120 may comprise computing devices, such as server computing devices having at least one processor and memory, and/or dedicated embedded devices, such as devices having control circuitry including Application Specific Integrated Circuits (ASICs) or Field Programmable Gate Arrays (FPGAs).

The distributed storage system 100 also comprise a set of n storage nodes 130. Each storage node 130 may comprise a processing device that is physically coupled to data storage devices such as disk drives and tape drives. In certain cases, storage nodes 130 may be implemented using server computing devices, control circuitry or virtual computing and data storage devices operating on underlying physical hardware. As such, a storage node may comprise a server in a cluster of multiple servers that control access to a storage array, where the storage array comprises a set of physical storage media (e.g., storage devices such as solid-state drives (SSDs), hard disk drives (HDDs), or the like, or a combination thereof). In other cases, a storage node may comprise a storage controller of a storage array. Each storage node may comprise a device on a storage area network (SAN). Storage nodes that form part of a storage area network may not form part of a local or wide area network that couples client devices (not shown) that access the data storage. A storage node may thus comprise a server computing device within the storage area network, as opposed to a server computing device on a local area network accessible to the client devices. A storage node may comprise a host layer device for the storage area network. Data may be stored within the distributed storage system 100 via multiple storage nodes. The storage nodes 130 may appear to a client device (not shown) as a single storage server. The storage nodes 130 may collectively provide data storage as a number of logical units. These logical units may be identified using Logical Unit Numbers (LUNs). One data storage device, such as a hard disk drive, may be partitioned into multiple logical units that act as storage volumes. The storage nodes 130 of the distributed storage system 100 may be referred to as a storage cluster. They offer data redundancy as storage of data and processing of data access commands may be distributed across the set of storage nodes 130. For example, a storage area network may comprise multiple storage nodes to avoid a single point of failure and/or to allow operations such as data back-up to be performed in a transparent manner to the client devices, e.g. the client devices may simply be able to see logical units that appear as accessible storage volumes, without being aware of the distributed set of servers and storage arrays that make up the storage area network. Storage area networks may be implemented using both physical and virtual devices, wherein the latter are in turn implemented upon appropriate hardware devices.

In use, client devices (not shown), such as computing devices providing services and applications across a network, send SCSI commands to storage nodes 130 so as to access data provided by the distributed storage system 100, e.g. data stored upon coupled data storage devices. SCSI commands may be sent from a SCSI driver that is implemented within the operating system or kernel of the client device. The SCSI driver may provide a virtual SCSI disk device to a client device. The SCSI driver may receive data storage and access requests from services and applications being executed by the client device, and convert these requests into SCSI commands that are sent to a storage node within the distributed storage system 100. A client device may be coupled to any number of storage nodes 130, e.g. over a network. The storage node that receives SCSI commands from the client device handles the request and provides selective access to coupled data storage devices. In this setup, the client device may take the role of an SCSI initiator. Client devices may be coupled to storage nodes via a suitable interconnect including physical couplings and/or network channels. Commands may be routed within the distributed storage network to an appropriate storage node, e.g. a storage node that manages a particular data storage device implementing a logical unit.

The SCSI-3 Persistent Reservation framework is provided to help manage distributed storage systems, such as those formed from storage nodes 130 in FIG. 1. Persistent Reservations enable data consistency when multiple client devices access data stored across multiple storage nodes. Persistent Reservations provide a mechanism for client devices to submit reservation requests for exclusive access to data storage provided by a storage node. A reservation may be made with respect to a particular SCSI target, such as a logical unit, e.g. as addressed using a LUN. Client devices that do not have a granted reservation may be denied access to a particular logical unit. The Persistent Reservation framework provides, amongst others, two groups of commands: registration commands and reservation commands. In order for a client device to make a reservation request it first submits a registration request. A registration request is made in association with a key that identifies the client device. Multiple registered client devices may form a group or membership. This group may then control access, e.g. by removing registrations to block access or by setting access permissions (e.g. to read-only or read-write). When a client device is finished with a logical unit it may release its reservation. In certain cases, a client device may unregister with a logical unit if it no longer wishes to access it. Multiple reservation types are available under the SCSI-3 Persistent Reservation framework, which allow a variety of access restrictions and that have varying scope (e.g. applying to one or multiple registrants).

In FIG. 1, the group leader 110 has access to Persistent Reservation (PR) data 115. The group leader 110 uses the PR data 115 to handle Persistent Reservation requests for the distributed storage system 100. For example, the group leader 110 may handle registration and reservation requests that are received by storage nodes 130. The group leader 110 may apply control logic to handle these requests based on a history of Persistent Reservation transactions that is stored as the PR data 115. The PR data 115 may comprise a relational database that is maintained on a data storage device that is locally-coupled to the group leader 110. The relational database may comprise a configuration database such as a Scale Out Database (SODB). The PR data 115 may comprise a reservation table that documents active reservations for the distributed storage system.

The backup group leader 120 also has access to PR data 125. PR data 125 may comprise a relational database that is maintained on a storage device that is locally-coupled to the backup group leader 125. In comparative implementations, PR data 125 is a synchronized copy of PR data 115. PR data 125 stores a record of Persistent Reservation operations to enable the backup group leader 120 to take over management of the distributed storage system 100 should the group leader 110 fail.

In one case, the group leader 110 and backup group leader 120 comprise storage nodes of the distributed storage system. For example, one or more of the group leader 110 and the backup group leader 120 may each comprise a server in a storage area network that also handles SCSI commands as a storage node. In one case, one or more of the group leader 110 and the backup group leader 120 may each comprise a server computing device that executes two processes, a first process that enables storage node functionality and a second process that enables group leader or backup group leader functionality. In another case, one or more of the group leader 110 and the backup group leader 120 may each comprise a server computing device that executes a process that enables storage node functionality that is further configured to also provide group leader or backup group leader functionality. In one case, one or more of the group leader 110 and the backup group leader 120 may be implemented using a storage controller of a storage array. In yet another case, the group leader 110 and backup group leader 120 comprise devices that are not storage nodes of the distributed storage system, e.g. may be dedicated control devices such as separate server computing devices upon a storage area network. These separate server computing devices may not be coupled to data storage devices. In one case, the group leader 110 comprises a physical computing device that executes a group data control process, e.g. in the form of a daemon that runs in the background on the computing device and handles requests received on a particular communication channel. The group data control process has access to PR data 115. In this case, the backup group leader 120 may comprise a computing device that is configured to start the group data control process if failover (e.g. failure of the group leader 110) occurs. The distributed storage system may be configured such that within a group of storage nodes there is one group leader at any one time. In this case, each storage node 130 may execute a data services control process (e.g. a daemon). In use, the data services control processes may communicate with the group data control process to handle Persistent Reservation commands.

One issue that exists in a redundant system such as that formed of group leader 110 and backup group leader 120 is that data is to be synchronized between the devices to allow the backup group leader 120 to take over operation from the group leader 110 if the group leader 110 should become inaccessible. According to comparative implementations of SCSI systems, the PR data 125 accessible to the backup group leader 120 has to match the PR data 115 accessible to the group leader 110. If the PR data 125 does not match the PR data 115 and failure of the group leader 110 occurs, this can lead to so-called "split-brain" syndrome, where certain storage nodes are operating based on a different state assumption to the backup group leader 120. For example, if the PR data 125 falls behind the PR data 115, then the storage nodes 130 may operate using data that indicates a first set of reservations are active, whereas the backup group leader 120, on taking control following failover, may operate using PR data 125 that indicates a second set of reservations are active. This may cause clashes—a client device may have data indicating it has exclusive access to a logical unit but the backup group leader 120 may have data that does not identify such a reservation. In this case, the backup group leader 120, on taking control, may approve a conflicting reservation for a different client device, leading to data integrity issues (e.g. both client devices may write data to the logical unit in a conflicting manner).

The example of FIG. 1 provides an implementation that is compatible with the SCSI standards but that does not perform complete synchronization of PR data, e.g. between the group leader 110 and the backup group leader 120. To do this a control system comprising a Persistent Reservation (PR) engine 140 and a synchronization engine 150 are provided.

The PR engine 140 is configured to receive Persistent Reservation commands from storage nodes within the distributed storage system. These may be SCSI commands that are sent from client devices to storage nodes as described above. Each storage node may be configured, e.g. via the data services control process, to forward Persistent Reservation commands to the PR engine 140. In one case, the PR engine 140 may form part of an adapted group data control process that runs upon an active group leader (e.g. group leader 110 during normal operation or backup group leader 120 following failover). In this case, the PR engine 140 may implement a process, e.g. may comprise a server computing device of a storage area network, where the process is implemented via instructions executed by the server computing device, together with a group leader process. The PR engine 140 is configured to filter or conditionally process the received Persistent Reservation commands. These commands may be registration and/or reservation requests as described above. If a received Persistent Reservation command meets predefined criteria it is admitted; if the command does not meet the criteria it is rejected. The PR engine 140 may be implemented as an adaptation of a data layer of the distributed storage system. For example, the PR engine 140 may implement a control process to be executed by a server computing device or a storage controller of a storage array within a storage area network. The PR engine 140 may implement a process to be executed on an existing server computing device or storage controller of a storage array of a storage area network, e.g. a device or controller that also acts as a storage node or the like, or may be a process that is executed on a stand-alone server computing device within the storage area network.

The synchronization engine 150 is configured to monitor a synchronization state between the group leader 110 and the backup group leader 120. In particular, the synchronization engine 150 may be configured to ascertain a synchronization state to respond to requests from the PR engine 140. The synchronization state indicates whether Persistent Reservation data for the group leader 110 is synchronized with the backup group leader 120. The synchronization engine 150 may periodically and/or continuously monitor a synchronization state, e.g. such that a current synchronization state is stored in memory. Alternatively, the synchronization engine 150 may determine the synchronization state when a request is received. The synchronization state may be categorized as a binary variable representing whether the backup group leader 120 is synchronized with the group leader 110, e.g. whether PR data 125 matches PR data 115. In a case where one or more of the group leader 110 and backup group leader 120 are not accessible, e.g. due to communication failure, the synchronization engine 150 may indicate that the devices are not synchronized. The synchronization engine 150 may implement an Application Programming Interface (API) that the PR engine 140 can call and that returns the synchronization state, e.g. via a command that may be executed or called. The synchronization engine 150 may be implemented as an adaptation of a management layer of the distributed storage system. In one case, the synchronization engine 150 may implement a group management control process (e.g. daemon) to run on a physical computing device. The synchronization engine 150 may also be implemented on a computing device (e.g., server) implementing an active group leader or upon a separate management server. For example, the synchronization engine 150 may implement a control process to be executed by an existing server computing device or storage controller of a storage array of a storage area network, e.g. a device or controller that also acts as a storage node or the like, or may be a process that is executed on a stand-alone server computing device within the storage area network.

In an example, the PR engine 140 is configured to first determine whether a received Persistent Reservation command indicates persistence through power loss, i.e. that a transaction performed in response to the command should persist through power loss of the distributed storage system. This may be performed by checking a state of the Active Persist Through Power Loss (APTPL) bit in the command. For example, if the bit is set (e.g. has a value of 1), this may indicate persistence through power loss, e.g. may indicate that persistence through power loss is active for the command.

In the present example, if the command does not indicate persistence through power loss, e.g. if the bit is not set and has a value of 0 or if the command is modifying the bit value from 1 to 0, then the PR engine 140 is configured to admit the command. A value of 0 may indicate that persistence through power loss is not active for the command. Admitting the command may comprise further processing the command to determine if a registration and/or reservation request is valid, e.g. if it does not conflict with pre-existing Persistent Reservation transactions stored in PR data 115. If the command is valid, then the PR engine 140 may perform an appropriate Persistent Reservation operation and store the transaction in the PR data 115. This may comprise recording a registration, e.g. storing a client device key, and/or recording a reservation for a particular client device and logical unit. In this way, the PR engine 140 is to admit commands that do not indicate persistence through power loss regardless of whether the Persistent Reservation data for the group leader is synchronized with the backup group leader.

If the command indicates persistence through power loss, e.g. if the bit is set and has a value of 1 or if the command is modifying the bit from a value of 0 to 1, then the PR engine 140 is configured to perform a further check using the synchronization engine 150. In this case, the PR engine 140 submits a request to the synchronization engine 150 for an indication of the synchronization state between the group leader 110 and the backup group leader 120. This may comprise performing an API call. The synchronization engine 150 either looks up or determines the synchronization state and returns a value indicative of the state to the PR engine 140 in response to the request. If the synchronization engine 150 indicates that the group leader 110 and backup group leader 120 are synchronized, e.g. PR data 125 matches PR data 115, then the command is admitted by the PR engine 140. As above, this may comprise further processing the command to determine if a registration and/or reservation request is valid, and conditionally recording a transaction. If the synchronization engine 150 indicates that the group leader 110 and backup group leader 120 are not synchronized, e.g. that PR data 125 does not match PR data 115, then the PR engine 140 is configured to reject the command. This may comprise sending a response to the originating storage node, which may then send a response to the appropriate client device.

The example of FIG. 1, as described above, uses an indication of persistence across power loss events to selectively process Persistent Reservation commands. If a client device (as a host) does not indicate persistence through power loss for a command, then the command is admitted and processed regardless of the synchronization state between the group leader 110 and the backup group leader 120. This means that the PR engine 140 does not hold up transactions that do not persist across power loss, which avoids delaying these transactions until synchronization is confirmed. Indeed, when synchronization between a group leader and a backup group leader is performed via a group wide synchronization, delaying these transactions until synchronization is confirmed may entail a wait until all PR data is synchronized across all storage nodes before Persistent Reservation commands can be processed. Such a mechanism is vulnerable to communication failures in any one node, as this can prevent full synchronization and halt data processing operations. Also, as the PR engine 140 performs a request to the synchronization engine 150 in the case that persistence through power loss is indicated, commands that do not request this feature may be processed without delay and without checking the synchronization state. This allows input/output operations to continue uninhibited. In the case that commands that request persistence through power loss are received by the PR engine 140, these commands are conditionally processed following a check on the synchronization state, ensuring that they are not accepted if the group leader and backup group leader are out of sync.

Figure 2:
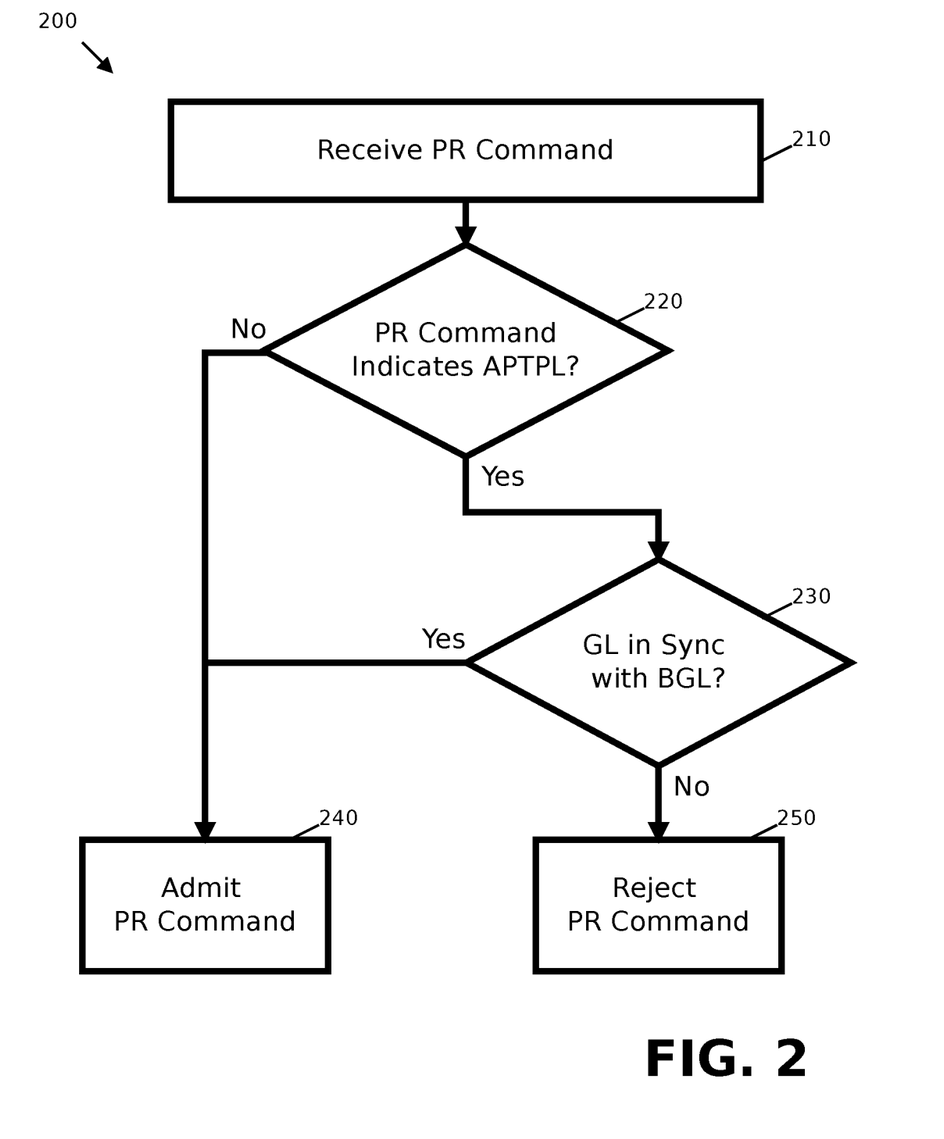
FIG. 2 is a flow diagram showing a method of managing a distributed storage system according to an example.

FIG. 2 shows a method 200 of managing a distributed storage system according to an example. The method may be implemented upon the distributed storage system 100 of FIG. 1 or upon a different distributed storage system. The method 200 may be implemented by a group data control process on a group leader of the distributed storage system. The group data control process may form part of a data layer with data services control processes that are running on the storage nodes. The distributed storage system may be limited to one group data control process. The method 200 may be embodied as computer readable instructions stored on at least one storage medium and executable by at least one processor, as described with reference to FIG. 6.

At block 210, a Persistent Reservation command is received from a storage node in the distributed storage system. For example, the command may be forwarded from a data services control process on the storage node to the group data control process in order to manage registrations and reservations within a cluster of storage nodes. At block 220, a determination is made as to whether the Persistent Reservation command indicates persistence through power loss. As described above, this may involve inspecting a APTPL bit within the command data.

Responsive to the Persistent Reservation command indicating persistence through power loss, e.g. that the transaction performed in association with the command is to persist through power loss of the distributed storage system, the method proceeds to block 230. Responsive to the Persistent Reservation command not indicating persistence through power loss, e.g. that the transaction performed in association with the command is not to persist through power loss of the distributed storage system, the method proceeds to block 240. At block 240, the command is admitted, i.e. passed for further processing by the group data control process according to the Persistent Reservation framework. When a queue of commands is set up, the method 200 thus comprises determining to process another command that does not indicate persistence through power loss, regardless of the synchronization state of the group leader and the backup group leader. At block 230, a further check is made. In this check, a determination is made as to whether a group leader of the distributed storage system is synchronized with a backup group leader. The group leader may comprise a device executing the group data control process. Block 230, may comprise making an API call to a management layer of the distributed storage system, e.g. to a group management control process. Responsive to the group leader being synchronized with the backup group leader, the method proceeds to block 240 and the command is admitted. Responsive to the group leader not being synchronized with the backup group leader, the method proceeds to block 250 where the command is rejected, i.e. not passed for further processing.

In certain examples, the method 200 comprises processing the command following block 240 and storing a result of the operation in a configuration database. The configuration database may comprise PR data 115 in FIG. 1. The result of the operation may be the registration of a new host (e.g. a new client device) or a reservation of a particular logical storage volume (e.g. a partition of a data storage device coupled to a storage node as identified by a LUN). An attempt may be made following this block, or periodically, to synchronize the configuration database across the storage nodes, including attempting to synchronize with the backup group leader. According to the present example, this synchronization does not have to be successful, the backup group leader can fall out of sync with the group leader for certain Persistent Reservation transactions.

Figure 3:
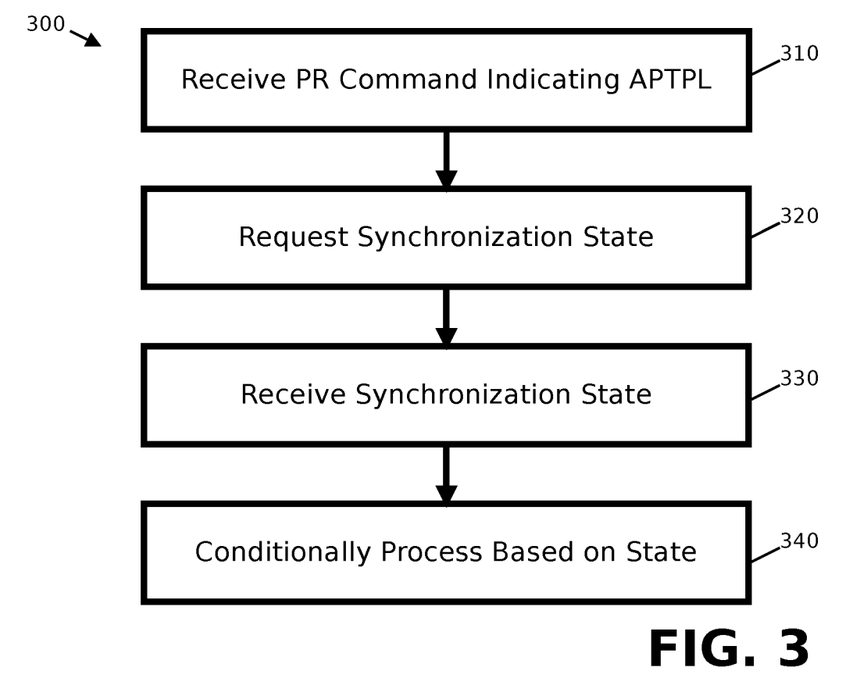
FIG. 3 is a flow diagram showing a method performed by a group data control process according to an example.

FIG. 3 shows an example method 300 that may be implemented by a group data control process operating on a node of the distributed storage system, e.g. in association with, or to implement, the method of FIG. 2. As discussed previously, the node may comprise a server computing device or storage controller that operates within a storage area network. The group data control process may be a process as described in other examples herein. The method 300 may be embodied as computer readable instructions stored on at least one storage medium and executable by at least one processor, as described with reference to FIG. 6. At block 310, a Persistent Reservation command is received at the group data control process, indicating that persistence through power loss is active. At block 320, in response to receipt of the persistent reservation command, an indication of a synchronization state of a group leader and a backup group leader of the distributed storage system is requested. This request may be made to an API, e.g. as implemented by an entity such as synchronization engine 150 in FIG. 1. At block 330, the indication of the synchronization state is received. At block 340, a determination is made as to whether to process the Persistent Reservation command based on the received indication. For example, if the indication shows that the group leader is not synchronized with the backup group leader then the command may be rejected as described with reference to FIG. 2.

In the examples of FIGS. 1 to 3, if the group leader fails, or is otherwise unavailable, then the backup group leader takes over responsibility for managing Persistent Reservation transactions. This may comprise starting a group data control process on the backup group leader. As such, in a failover scenario, the backup group leader becomes an active group leader. If the old group leader becomes operational at a later point, it no longer acts as the group leader. For example, there may be a restriction that a single group data control process is allowed on a distributed storage system (or group of storage nodes within that system). Once the old group leader becomes operational, a check may be made, e.g. by a data services or other control process, as to whether a group data control process is running within the distributed storage system. If a group data control process is running, e.g. on the old backup group leader acting as current group leader, then activation of the group data control process on the old group leader is prevented.

Failover may occur automatically and/or may be initiated manually. In the former case, one or more operating parameters of the group leader may be monitored, e.g. by a device implementing a management layer of the distributed storage system, and variation from a predefined operating range may trigger shutdown of the group data control process on the group leader and the activation of a copy of the same process on the backup group leader. A similar procedure may take place if the group leader becomes inaccessible, e.g. fails a ping test over a network or fails to acknowledge commands sent over a physical interconnect.

In one example, following a group leader failover operation, e.g. the backup group leader becoming a new group leader, the method 200 may further comprise conditionally clearing cached Persistent Reservation data. A condition may be if such data is already out of sync prior to the failover, e.g. clearing data that does not indicate persistence through power loss that is out of sync. This may comprise the old backup group leader (such as backup group leader 120 in FIG. 1) or another control component, such as a group management control process, deleting any transactions in its configuration database that do not instruct persistence through power loss (e.g. deleting all transactions in the PR data 125 that do not have the APTPL bit set). This ensures that all the persistence through power loss data in the configuration database used by the new group leader match those previously held in the configuration database used by the old group leader (e.g. PR data with the APTPL bit set match, at the point of failover, between PR data 115 and PR data 125).

Figure 4:
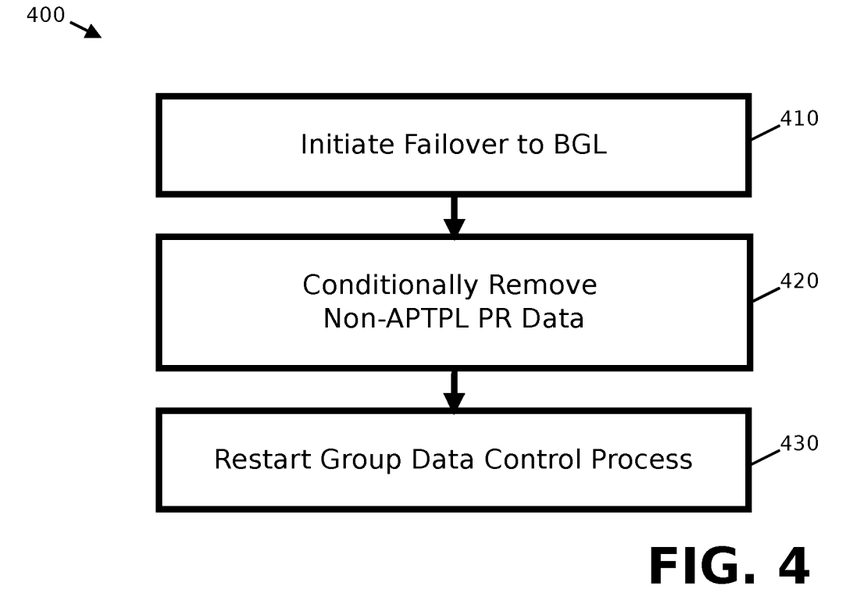
FIG. 4 is a flow diagram showing a method of performing failover in a distributed storage system according to an example.
Figure 5:
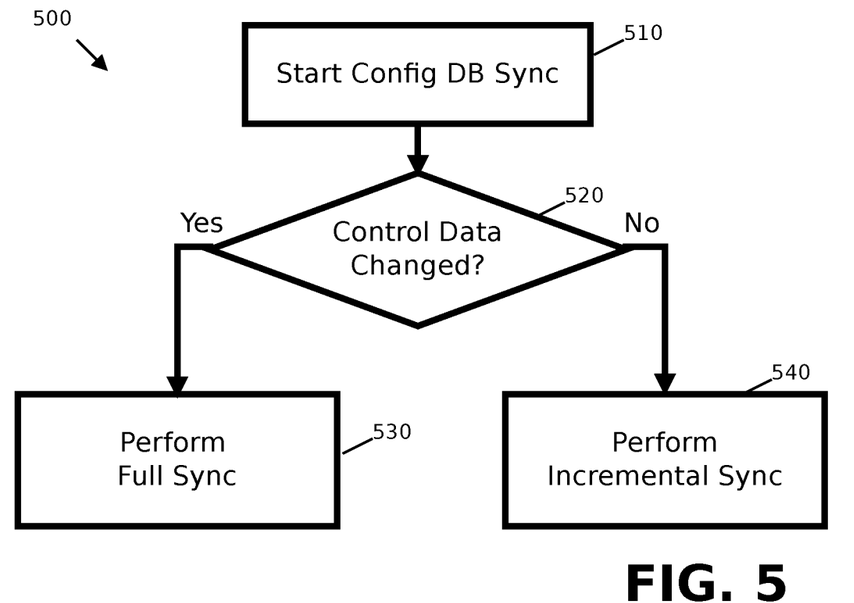
FIG. 5 is a flow diagram showing a method performed at a storage node of a distributed storage system according to an example.

FIGS. 4 and 5 show example methods 400, 500 that ensure that PR data is synchronized across storage nodes following failover to a backup group leader when applying the system of FIG. 1 and/or the methods of FIG. 2 or 3. Each of methods 400 and 500 may be embodied as computer readable instructions stored on at least one storage medium and executable by at least one processor, as described with reference to FIG. 6.

The method 400 may be performed by one or more server computing devices that form part of a management layer of the distributed storage system. These server computing devices may comprise servers within a storage area network. The method 400 of FIG. 4 starts at block 410, where failover to a backup group leader is initiated, e.g. as discussed above. At block 420, if PR data is already out of sync prior to the failover, the subset of PR data that are not bound to persistence through power loss are removed from a configuration database accessible to the new group leader (e.g. from PR data 125). This then conditionally removes PR Data that does not indicate persistence through power loss. Block 420 may be performed by a control process operating in the management layer of the distributed storage system, e.g. a group management control process. In one case, block 420 may be performed by a control process that also implements synchronization engine 150. In another case, block 420 may be performed by the new group leader (e.g. a group data control process operating on old backup group leader 120). At block 430, a group data control process is restarted on the backup group leader. This may result in the backup group leader becoming the new current group leader. The process of restarting the group data control process may include incrementing a version number of the configuration database. This may be referred to as a "master version number".

In certain cases, before or during block 410, services and applications that are using the distributed storage system may be stopped. This may be enacted during a manual failover. This may avoid data access requests being received during the failover process. In a manual failover case, block 410 may include stopping a group data control process operating on the group leader (e.g. if the group leader is accessible but operating out of specified parameters). In this case, following block 430, the services and applications may be restarted. Once block 430 is enacted, then the configuration database may be synchronized across the storage nodes, and between the new group leader and the storage nodes. This may occur, as discussed previously, as part of a periodic or continuous background synchronization process. This may occur automatically during operation of the distributed storage system once block 430 is complete.

The method 500 of FIG. 5 shows an example set of operations that may occur on a storage node to implement the synchronization following block 430 in FIG. 4. In this case, each storage node has a copy of the configuration database, in addition to the backup group leader. These operations may be performed by a data services control process running on the storage node. At block 510, the storage node begins to synchronize the configuration database. This may occur as part of a periodic or continuous synchronization routine, or when the group data control process initiates the synchronization by a storage node after processing admitted PR commands. At block 520, the storage node determines if control data associated with a group data control process operating on one of the group leader and the backup group leader has changed. This control data may comprise one or more of a version number for the configuration database and an identifier associated with a device on which a group data control process is running. If control data has changed then the method proceeds to block 530, where a full re-synchronization is performed. This involves ensuring that the entries in the configuration database accessed by the storage node match those of the new group leader (e.g. the backup group leader that took over control at block 430 of FIG. 4). This may be achieved by deleting entries in the local configuration database and downloading replacement entries from the new group leader. If control data has not changed then, at block 540, an incremental synchronization is performed. This may comprise adding and/or removing entries in the local configuration database by downloading recent entries from the configuration database of the new group leader to the local configuration database based on one or more version numbers. This may comprise including a result of new admitted Persistent Reservation commands, such as new reservations or registrations.

The example method of FIG. 5 operates to re-synchronize PR data held by storage nodes following failover. For example, data services control processes may be configured to re-synchronize their PR data when they detect a change in the master version number of a configuration database that is synchronized between the storage nodes. The example method of FIG. 5 can use this mechanism and artificially increment the version number following failover to ensure a full re-synchronization occurs. In a case where the group leader was not synchronized with the backup group leader prior to failover, then some storage nodes may retain a copy of the PR data as held by the group leader, which may differ from that used by the new group leader (i.e. the old backup group leader). Performing a full re-synchronization, resets the storage node to ensure consistency with the new group leader. This same re-synchronization may alternatively be triggered based on a detected change in a device identifier associated with the group data control process (e.g. an array identifier for the device executing the control process). In this case, a change will occur when failover occurs as the device identifier of the backup group leader will differ from the device identifier of the group leader. Once failover occurs and a full re-synchronization is performed, then storage nodes may use the current PR data to locally process certain Persistent Reservation commands, such as checking whether a client device holds an active reservation for a particular data storage device. A similar process also occurs following an incremental synchronization. New registration or reservation commands may be forwarded to the new group leader as previously discussed.

Figure 6:
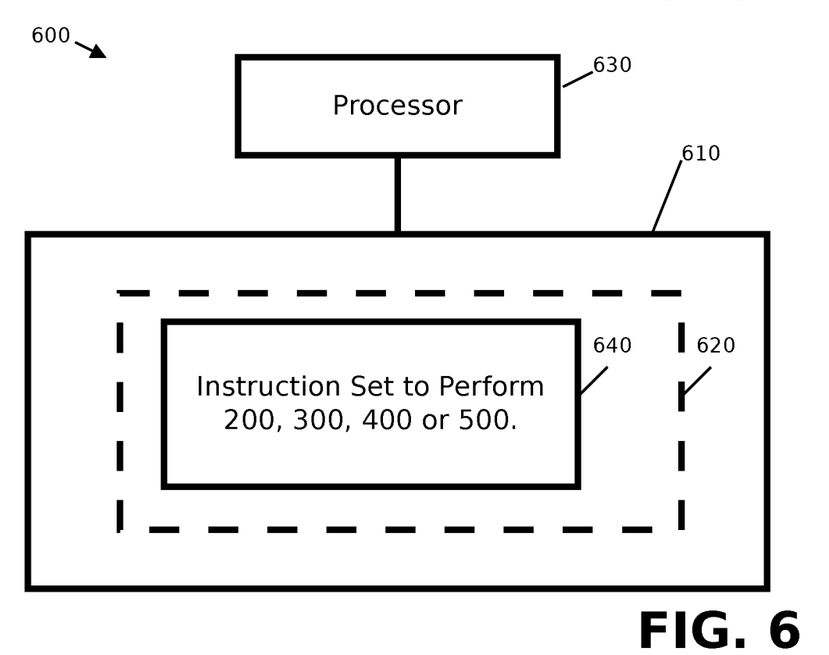
FIG. 6 is a schematic diagram showing a non-transitory computer-readable storage medium according to an example.

FIG. 6 shows an example 600 of machine-readable storage medium 610. The machine-readable storage medium may be any electronic, magnetic, optical, or other physical storage device that contains or stores executable instructions 620. Thus, the machine-readable storage medium may comprise, for example, various Random-Access Memory (RAM), Read Only Memory (ROM), flash memory, and combinations thereof. For example, the machine-readable medium may include a Non-Volatile Random-Access Memory (NVRAM), an Electrically Erasable Programmable Read-Only Memory (EEPROM), a storage drive, a NAND flash memory, and the like. Further, the machine-readable storage medium is computer-readable and non-transitory.

In FIG. 6, the executable instructions 620 are executed by a processor 630 The processor may include at least one central processing unit (CPU), at least one semiconductor-based microprocessor, other hardware devices or processing elements suitable to retrieve and execute instructions stored in memory, or combinations thereof. The processor can include single or multiple cores on a chip, multiple cores across multiple chips, multiple cores across multiple devices, or combinations thereat. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

In the case of FIG. 6, the non-transitory computer readable medium 610 contains computer program instructions 620 to cause the processor 630 to perform a number of operations 640 to implement one or more of the example methods 200, 300, 400 or 500, or any other set of operations described herein.

The term engines as described herein may be any combination of hardware and programming to implement the functionalities of the engine(s). In examples described herein, such combinations of hardware and programming may be implemented in a number of different ways, one of which includes the configuration of FIG. 6. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device at least partially implementing an engine described herein may include the at least one machine-readable storage medium storing the instructions and the at least one processing resource to execute the instructions. In other examples, the engine may be implemented by electronic circuitry.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein: rather, processes may be performed in a different order or concurrently and blocks may be added or omitted.

What is claimed is:

1. A method of managing a distributed storage system comprising:
   receiving, with a group data control process operating on a node of the distributed storage system, a Persistent Reservation command;
   in response to determining that the Persistent Reservation command indicates persistence through power loss, requesting an indication of a synchronization state of a group leader and a backup group leader of the distributed storage system; and
   receiving the indication of the synchronization state;
   determining with the group data control process whether to process the Persistent Reservation command based on the received indication of the synchronization state; and
   admitting or rejecting the Persistent Reservation command based on the determination of whether to process the Persistent Reservation command;
   determining to process another Persistent Reservation command, that does not indicate persistence through power loss, regardless of the synchronization state of the group leader and the backup group leader; and
   admitting the another Persistent Reservation command based on the determination to process the another Persistent Reservation command.

2. The medium of claim 1, the instructions comprising instructions to cause the processor to:

in a group leader failover operation, conditionally clear cached Persistent Reservation data.

3. The medium of claim 2, the instructions comprising instructions to cause the processor to:
responsive to starting a group data control process on one of the group leader and the backup group leader, increment a version number for the Persistent Reservation data.

4. The medium of claim 2, wherein the instructions to conditionally clear cached Persistent Reservation data comprise instructions to:
when the Persistent Reservation data was not synchronized between the group leader and the backup group leader prior to the failover, clear data of the cached Persistent Reservation data that does not indicate persistence through power loss.

5. The medium of claim 1, the instructions comprising instructions to implement a group data control process running on the group leader, and wherein the Persistent Reservation command is received from a data services control process that is being executed on the storage node of the distributed storage system.

6. The medium of claim 1, comprising instructions that cause the processor to:
responsive to admittance of the Persistent Reservation command, synchronize Persistent Reservation data with storage nodes of the distributed storage system.

7. A system for a distributed storage system comprising:
at least one processor; and
at least one non-transitory computer-readable storage medium storing instructions executable by the at least one processor to:
in response to respective requests, provide respective indications of whether Persistent Reservation data for a group leader of the distributed storage system is synchronized with a backup group leader of the distributed storage system;
receive Persistent Reservation commands from storage nodes within the distributed storage system;
admit Persistent Reservation commands that indicate persistence through power loss based on an indication that the Persistent Reservation data for the group leader is synchronized with the backup group leader; and
admit Persistent Reservation commands that do not indicate persistence through power loss regardless of whether the Persistent Reservation data for the group leader is synchronized with the backup group leader.

8. The system of claim 7, wherein the instructions are executable by the at least one processor to determine, for each of the Persistent Reservation commands, whether the Persistent Reservation command indicates persistence through power loss by analyzing a state of an active persist through power loss bit associated with the Persistent Reservation command.

9. The system of claim 7, wherein the instructions are to implement a part of a group data control process of the group leader.

10. The system of claim 7, wherein the instructions comprise instructions to:
for each of the Persistent Reservation commands that indicate persistence through power loss:
admit the Persistent Reservation command that indicates persistence through power loss responsive to the group leader being synchronized with the backup group leader; and
reject the Persistent Reservation command that indicates persistence through power loss responsive to the group leader not being synchronized with the backup group leader.

11. A method of managing a distributed storage system comprising:
receiving, with a group data control process operating on a node of the distributed storage system, a Persistent Reservation command;
in response to determining that the Persistent Reservation command indicates persistence through power loss, requesting an indication of a synchronization state of a group leader and a backup group leader of the distributed storage system; and
receiving the indication of the synchronization state;
determining with the group data control process whether to process the Persistent Reservation command based on the received indication of the synchronization state;
admitting or rejecting the Persistent Reservation command based on the determination of whether to process the Persistent Reservation command;
determining to process another Persistent Reservation command, that does not indicate persistence through power loss, regardless of the synchronization state of the group leader and the backup group leader; and
admitting the another Persistent Reservation command based the determination to process the another Persistent Reservation command.

12. The method of claim 11, wherein the group data control process operates on the group leader of the distributed storage system.

13. The method of claim 12, wherein the synchronization state indicates whether records of a configuration database are synchronized between the group leader and the backup group leader, and wherein the method comprises:
initiating a failover operation for the group leader;
conditionally clearing records in the configuration database that are not synchronized between the backup group leader and the group leader;
and
restarting the group data control process on the backup group leader, including incrementing a version number for the configuration database.

14. The method of claim 13, comprising:
on a storage node of the distributed storage system, determining if the version number for the configuration database has changed; and
responsive to a determination that the version number has changed, re-synchronizing the configuration database with the group data control process.

15. The method of claim 13, wherein the conditionally clearing records in the configuration database that are not synchronized between the backup group leader and the group leader comprises:
clearing records in the configuration database that do not indicate persistence through power loss and that are not synchronized between the backup group leader and the group leader.

16. The method of claim 11, comprising:
on a storage node of the distributed storage system, determining if an identifier associated with a device on which the group data control process is running has changed; and
responsive to a determination that the identifier has changed, re-synchronizing a configuration database with the group data control process.

17. The method of claim 11, comprising, following admittance of the Persistent Reservation command:
- determining, on a storage node of the distributed storage system, if control data associated with the group data control process operating on one of the group leader and the backup group leader has changed; and
- performing a full synchronization of the configuration database accessible to the storage node responsive to a change in the control data, or
- performing an incremental update of the configuration database accessible to storage node to include the admitted Persistent Reservation command responsive to an absence of a change in the control data.

18. The method of claim 17, comprising:
- at the storage node, processing input/output commands based on the configuration database accessible to the storage node.

19. The method of claim 11, comprising:
- admitting the Persistent Reservation command based on a determination that the group leader is synchronized with the backup group leader.

20. The method of claim 11, comprising:
- rejecting the Persistent Reservation command based on a determination that the group leader is not synchronized with the backup group leader.

* * * * *